United States Patent
Ye et al.

(10) Patent No.: US 12,466,286 B2
(45) Date of Patent: Nov. 11, 2025

(54) AUTOMOBILE STARTING POWER SUPPLY WITH VOICE PROMPT FUNCTION, AND VOICE BROADCAST METHOD THEREOF

(71) Applicant: Dong Guan Zhong Kang Technology Electronics Co., Ltd, Dongguan (CN)

(72) Inventors: Jianxin Ye, Dongguan (CN); Yuping Luo, Dongguan (CN); Shihao Huang, Dongguan (CN); Weizhong Zhang, Dongguan (CN)

( * ) Notice: Subject to any disclaimer, the term of this patent is extended or adjusted under 35 U.S.C. 154(b) by 1000 days.

(21) Appl. No.: 17/644,777

(22) Filed: Dec. 16, 2021

(65) Prior Publication Data

US 2022/0111756 A1 Apr. 14, 2022

(30) Foreign Application Priority Data

Dec. 18, 2020 (CN) .......................... 202011502667.3

(51) Int. Cl.
*B60L 58/12* (2019.01)
*B60R 16/023* (2006.01)
*B60R 16/03* (2006.01)
*G05B 19/042* (2006.01)
(Continued)

(52) U.S. Cl.
CPC ............ *B60L 58/12* (2019.02); *B60R 16/023* (2013.01); *B60R 16/03* (2013.01); *G05B 19/0423* (2013.01); *H02J 7/0063* (2013.01); *B60T 17/22* (2013.01); *H02J 2310/46* (2020.01); *H02J 2310/48* (2020.01)

(58) Field of Classification Search
CPC ....... B60L 58/12; B60R 16/023; B60R 16/03; G05B 19/0423; H02J 7/0063; H02J 2310/46; H02J 2310/48
See application file for complete search history.

(56) References Cited

U.S. PATENT DOCUMENTS

2001/0038274 A1\* 11/2001 Peter ..................... F02N 11/087
320/104
2010/0100287 A1\* 4/2010 Kasai ..................... B60R 25/00
701/48
2012/0126614 A1 5/2012 Inoue et al.
(Continued)

FOREIGN PATENT DOCUMENTS

| CN | 202696190 U | * | 1/2013 |
| CN | 207801255 U | * | 8/2018 |
| JP | 2005135641 A | * | 5/2005 |

OTHER PUBLICATIONS

CN-202696190 Mt (Year: 2013).*

*Primary Examiner* — Alexander Usyatinsky
(74) *Attorney, Agent, or Firm* — Hemisphere Law, PLLC; Zhigang Ma

(57) ABSTRACT

The present disclosure relates to the technical field of emergency power supplies of automobiles, in particular to an automobile starting power supply with a voice prompt function and a voice broadcast method thereof. The automobile starting power supply includes a shell; a wireless charging device, a main circuit board, a storage battery, and a loudspeaker are arranged inside the shell; the wireless charging device is located at a top of the shell; the main circuit board is arranged below the wireless charging device; the storage battery is arranged below the main circuit board; a mesh through hole is formed in one side of the shell; and the loudspeaker corresponds to the mesh through hole.

9 Claims, 8 Drawing Sheets

(51) Int. Cl.
*H02J 7/00* (2006.01)
*B60T 17/22* (2006.01)

(56) References Cited

U.S. PATENT DOCUMENTS

2018/0109124 A1* 4/2018 Kim .................. H02H 3/243
2019/0235026 A1* 8/2019 Ye ...................... H02J 50/12

* cited by examiner

AUTOMOBILE STARTING POWER SUPPLY WITH VOICE PROMPT FUNCTION, AND VOICE BROADCAST METHOD THEREOF

TECHNICAL FIELD

The present disclosure relates to the technical field of emergency power supplies of automobiles, in particular to an automobile starting power supply with a voice prompt function, and a voice broadcast method thereof.

BACKGROUND

As people's economic level increases, automobiles have become the main means of transportation for public travel. When an automobile stalls or cannot be started, people usually find a repair shop where the automobile will be started with a battery, or find other vehicles to transfer electricity to start the automobile. This method is very inconvenient because the repair shop cannot provide such services after work, and other vehicles may not be found in time to solve such problems. Therefore, some troubles are brought to people for going out. The emergence of an automobile starting power supply effectively solves the problem that an automobile cannot be started after it stalls. The automobile starting power supply in the existing art generally includes a shell, a lithium battery, an ignition clip, and a control circuit module. The control circuit module supports charging or discharging of the lithium battery. The lithium battery is used for automobile ignition during discharging.

However, only realizing the function of igniting the automobile will result in low use value of the automobile starting power supply, and the lithium battery cannot be fully used to realize more functions, resulting in less use of the automobile starting power supply and correspondingly high purchase cost. To this end, the Chinese invention patent application No. 201810085972.3 proposes a method and device of a microprocessor to process data of an automobile multi-functional charger, so that the automobile starting power supply can have functions of ignition, charging, lighting, and wireless communication at the same time, and the lithium battery is fully used, which brings more conveniences to car travel. The Chinese invention patent application No. 201621075255.5 also discloses an automobile starting power supply with inverter, so that the automobile starting power supply can have an AC socket. However, the automobile starting power supply does not have a voice broadcast function. As the automobile starting power supply gradually becomes multifunctional, the number of buttons and the number of interfaces on the automobile starting power supply increase, and operations of a user become more cumbersome. If there is an error that is not prompted in time, irreversible loss will be caused. Therefore, it is necessary to propose an automobile starting power supply with a voice broadcast function to enable users to use the automobile starting power supply more safely and conveniently.

SUMMARY

In order to overcome the above deficiencies, the present disclosure aims to provide a technical solution capable of solving the above problems.

An automobile starting power supply with a voice prompt function includes a shell; a wireless charging device, a main circuit board, a storage battery, and a loudspeaker are arranged inside the shell; the wireless charging device is located at a top of the shell; the main circuit board is arranged below the wireless charging device; the storage battery is arranged below the main circuit board; a mesh through hole is formed in one side of the shell; the loudspeaker corresponds to the mesh through hole; a front side end of the shell is provided with a front operating table; an ignition output control button, a charging output control button, an ignition output interface, a USB output interface, a TYPE-C interface, and a charging interface are arranged in front of the front operating table; an upper end of the front operating table is provided with an LED battery power display lamp; LED lighting assemblies are respectively arranged on two sides of the shell corresponding to the front operating table; a rear end of the shell is provided with a rear operating table; an alternating current (AC) output jack is arranged on a rear side of the rear operating table; an upper end of the rear operating table is provided with an AC output control button; the wireless charging device, the storage battery, the loudspeaker, the ignition output control button, the charging output control button, the ignition output interface, the USB output interface, the TYPE-C interface, the charging interface, the LED battery power display lamp, the AC output jack, and the AC output control button are all electrically connected to the main circuit board, so that the main circuit board correspondingly broadcasts a state of the current automobile starting power supply through the loudspeaker.

Preferably, the shell includes an upper circular cover, a lower circular cover, a left U-shaped fixture block, a right U-shaped fixture block, and a rear U-shaped fixture block; the upper circular cover and the lower circular cover are clamped for covering through the left U-shaped fixture block, the right U-shaped fixture block, and the rear U-shaped fixture block; the left U-shaped fixture block and the right U-shaped fixture block are respectively located on two sides of the front operating table; the two LED lighting assemblies respectively pass through the left U-shaped fixture block and the right U-shaped fixture block; the rear U-shaped fixture block covers the rear operating table; and the AC output jack and the AC output control button both pass through the rear U-shaped fixture block.

Preferably, the wireless charging device includes a wireless charging circuit board; the wireless charging circuit board is provided with a wireless charging coil and three wireless charging indicator lamps surrounding a periphery of the wireless charging coil; the wireless charging coil is attached to an inner side of the upper circular cover; the wireless charging indicator lamps protrude from the upper circular cover; and the three wireless charging indicator lamps respectively press against the left U-shaped fixture block, the right U-shaped fixture block, and the rear U-shaped fixture block.

Preferably, the LED lighting assemblies include an LED circuit board vertically mounted inside the shell, an LED lighting lamp arranged on the LED circuit board, two lighting lamp control buttons arranged on the LED circuit board, and a transparent hood movably arranged on the shell in a penetrating manner; the two lighting lamp control buttons are respectively located at an upper part and a lower part of the LED circuit board; the LED lighting lamp is located between the two lighting lamp control buttons; the transparent hood corresponds to the LED lighting lamp; and an upper end and a lower end of the transparent hood respectively press against the two lighting lamp control buttons.

Preferably, the main circuit board is provided with a micro processing unit (MCU) main control chip IC6 and a peripheral circuit connected to the MCU main control chip IC6; the model number of the MCU main control chip IC6 is HT67F489; the ignition output control button, the charging output control button, the AC output control button, the lighting lamp control button, the charging interface, the storage battery, the ignition output interface, the AC output jack, the USB output interface, the TYPE-C interface, the wireless charging device, the LED lighting assemblies, the loudspeaker, and the LED battery power display lamp are all electrically connected to the MCU main control chip IC6 through the peripheral circuit; and the various electronic elements can be controlled by the MCU main control chip IC6 to run.

Preferably, the peripheral circuit is provided with an ignition interface detection circuit, a battery protection circuit, and a voice control circuit; the ignition interface detection circuit is provided with an ignition current detection circuit for determining whether an ignition action or overcurrent occurs at the ignition output interface, a battery reverse charging current detection circuit for detecting whether a reverse charging current appears at the ignition output interface, an ignition clip fall-off detection circuit for detecting whether the ignition clip falls off after the automobile is powered on, and an ignition output polarity reverse connection detection circuit for detecting whether a positive polarity and a negative polarity of the ignition clip output are reversely connected; the battery protection circuit is provided with a battery over-discharging and over-charging protection circuit for detecting over-charging when the storage battery is charged or detecting over-discharging when the storage battery supplies power; the voice control circuit includes a voice module with the model number of HFC071P17; the voice module stores a voice data packet; the MCU main control chip IC6 receives signals generated by the ignition output control button, the charging output control button, the AC output control button, the lighting lamp control button, the ignition interface detection circuit, and the battery protection circuit, converts the signals into corresponding voice data signals, and sends the voice data signals to the voice module; and the voice module unscrambles the corresponding voice data of the voice data packet according to the voice data signals and converts the voice data into a voice for playing through the loudspeaker.

A voice broadcast method of an automobile starting power supply involves an automobile starting power supply with a voice prompt function, and is implemented by a program loaded in the MCU main control chip IC6 and voice data stored in the voice module. The voice broadcast method includes the following steps:

step 1, setting the ignition output control button, the charging output control button, the AC output control button, and the light lamp control button on the automobile starting power supply, setting the MCU main control chip IC6 on the main circuit board of the automobile starting power supply, setting a program memory inside the MCU main control chip IC6, and loading a button control program module, a battery power monitoring program module, an ignition interface control program module, an AC interface control program module, a charging interface control program module, a lighting lamp control program module, and a voice conversion program module in the program memory, instructions of the various program modules being suitable for being loaded and operated by a processor;

step 2, setting the voice module on the main control board of the automobile starting power supply, pre-storing a voice data packet in the voice module, performing, by the MCU main control chip IC6, data transmission through the voice conversion program module and the voice module, and unscrambling the voice data packet;

step 3, identifying, by the MCU main control chip IC6, all the buttons through the button control program module; generating, when the lighting lamp control buttons corresponding to the two LED lighting assemblies are pressed at the same time for 5 seconds, a first instruction signal; controlling, by the MCU main control chip IC6, the loudspeaker to be turned on and turned off through a second instruction signal; when the voice conversion program module is operated, proceeding to the following steps;

step 4, when the automobile starting power supply is in a standby state, pressing any button at the first time to generate the second instruction signal, and receiving, by the voice conversion program module and the battery power monitoring program module, the second instruction signal, wherein after receiving the second instruction signal, the voice conversion program module sends a voice data signal to the voice module for unscrambling the voice data packet to acquire startup voice data, and the voice data is broadcast through the loudspeaker; after receiving the second instruction signal, the battery power monitoring program module drives the LED battery power display lamp to display the battery power of the current lithium storage battery and completes a startup operation; in the meantime:

when the ignition output control button is pressed, the second instruction signal drives the ignition interface control program module to control the ignition output interface to be turned on; furthermore, the voice conversion program module sends a voice data signal again immediately after the voice data signal is sent; ignition starting voice data is unscrambled; the ignition starting voice data is broadcast through the loudspeaker immediately after startup voice data is broadcast;

when the charging output control button is pressed, the second instruction signal drives the charging interface control program module to control the USB output interface, the TYPE-C interface, and the wireless charging device to be turned on; furthermore, the voice conversion program module sends a voice data signal again immediately after the voice data signal is sent; charging starting voice data is unscrambled; the charging starting voice data is broadcast through the loudspeaker immediately after startup voice data is broadcast;

when the AC output control button is pressed, the second instruction signal drives the AC interface control program module to control the AC output jack to be turned on; furthermore, the voice conversion program module sends a voice data signal again immediately after the voice data signal is sent; AC starting voice data is unscrambled; the AC starting voice data is broadcast through the loudspeaker immediately after startup voice data is broadcast;

when the lighting lamp control button is pressed, the second instruction signal drives the lighting lamp control program module to control the LED lighting assembly to be turned on; furthermore, the voice conversion program module sends a voice data signal again immediately after the voice data signal is sent; LED starting voice data is unscrambled; the LED starting voice data is broadcast through the loudspeaker immediately after startup voice data is broadcast;

step 5, after the automobile starting power supply is in a startup state, pressing any button, and generating a third instruction signal, wherein:

when the ignition output control button is pressed, the third instruction signal drives the ignition interface control program module and the voice conversion program module; the ignition interface control program module controls the ignition output interface to be turned on; the voice conversion program module sends the voice data signal to the voice module for unscrambling the voice data packet to acquire voice data indicating ignition for starting; the voice data is broadcast through the loudspeaker;

when the charging output control button is pressed, the third instruction signal drives the charging interface control program module and the voice conversion program module; the charging interface control program module controls the USB output interface, the TYPE-C interface, and the wireless charging device to be turned on; the voice conversion program module sends the voice data signal to the voice module for unscrambling the voice data packet to acquire charging starting voice data; the voice data is broadcast through the loudspeaker;

when the AC output control button is pressed, if the button pressed at the previous time is other button, the current third instruction signal drives the AC interface control program module and the voice conversion program module; the AC interface control program module controls the AC output jack to be turned on; the voice conversion program module sends the voice data signal to the voice module for unscrambling the voice data packet to acquire AC starting voice data; the voice data is broadcast through the loudspeaker; if the button pressed at the previous time is also the AC output control button, the third instruction signal controls the automobile starting power supply to enter the standby state;

when the lighting lamp control button is pressed, if the button pressed at the previous time is other button, the current third instruction signal drives the lighting lamp control program module and the voice conversion program module; the lighting lamp control program module controls the LED lighting assembly to be turned on; the voice conversion program module sends the voice data signal to the voice module for unscrambling the voice data packet to acquire LED starting voice data; the voice data is broadcast through the loudspeaker; if the button pressed at the previous time is also the lighting lamp control button, the third instruction signal controls the automobile starting power supply to enter the standby state.

Preferably, the setting the ignition interface detection circuit on the main circuit board of the automobile starting power supply to detect a state of the current automobile starting power supply includes the following steps:

step 1, in the ignition interface detection circuit, setting an ignition current detection circuit, a battery reverse charging current detection circuit, an ignition clip fall-off detection circuit, and an ignition output polarity reverse connection detection circuit, and loading an ignition interface detection program module in the program memory of the MCU main control chip IC6, an instruction of the ignition interface detection program module being suitable for being loaded and operated by the processor;

step 2, when the automobile starting power supply is in the startup state, and the ignition interface control program module is operated, operating the ignition interface detection program module to drive the ignition current detection circuit, the battery reverse charging current detection circuit, the ignition clip fall-off detection circuit, and the ignition output polarity reverse connection detection circuit;

step 3, sampling, by the ignition current detection circuit, a voltage drop of two ends of a negative electrode electronic wire of the storage battery; sending an amplified voltage signal to the ignition interface detection program module of the MCU main control chip IC6 for processing; if the ignition clip is connected successfully, controlling the voice conversion program module to send the voice data signal to the voice module for unscrambling the voice data packet to acquire voice data indicating that the ignition clip is connected successfully, and broadcasting the voice data through the loudspeaker; after the ignition clip completes an ignition action, controlling the voice conversion program module to send the voice data signal to the voice module for unscrambling the voice data packet to acquire voice data indicating that the ignition clip completes the ignition, and broadcasting the voice data through the loudspeaker; after the broadcasting, stopping operating the ignition interface control program module to enable the automobile starting power supply to enter the standby state; if the ignition clip does not complete the ignition action, performing, by the ignition interface detection program module, counting; when the ignition clip has not completed the ignition action for three continuous times, sending, by the voice conversion program module, the voice data signal to the voice module for unscrambling the voice data packet to acquire voice data indicating that the ignition clip has not completed ignition, and broadcasting the voice data through the loudspeaker; after the broadcasting, stopping operating the ignition interface control program module, and setting that the ignition interface control program module is incapable of being driven by the second instruction signal and the third instruction signal within 5 minutes;

detecting, by the battery reverse charging current detection circuit, whether the storage battery in an automobile engine is reversely charged; when it is detected that a reverse charging current is too high, stopping operating the ignition interface control program module; sending, by the voice conversion program module, the voice data signal to the voice module for unscrambling the voice data packet to acquire voice data indicating that the reverse charging current is too high; broadcasting the voice data through the loudspeaker; after the broadcasting, entering the standby state;

detecting, by the ignition clip fall-off detection circuit, a magnitude of a current of an output wire of the storage battery flowing through a negative wire; when an external voltage is close to or greater than a voltage of the storage battery of the product, and an ignition output current is less than 3 A±0.3 A, determining that the clip falls off; when it is determined that the clip falls off, driving, by the ignition interface control program module, the ignition output interface to be turned on for 3 seconds and turned off for 0.5 second, repeating such operation for 5 minutes to stop operating the ignition interface control program module; sending, by the voice conversion program module, the voice data signal to the voice module for unscrambling the voice data packet to acquire voice data indicating that the clip falls off, and broadcasting the voice data through the loudspeaker; after the broadcasting, entering the standby state; when it is detected that the clip falls off, stopping operating the ignition interface control program module within 3 seconds; sending, by the voice conversion program module, the voice data signal to the voice module for unscrambling the voice data packet to acquire voice data indicating that the clip falls off, and broadcasting the voice data through the loudspeaker; after the broadcasting, entering the standby state;

detecting, by the ignition output polarity reverse connection detection circuit, whether a positive electrode and a negative electrode of the ignition clip are reversely connected; when the positive electrode and the negative electrode of the ignition clip are reversely connected, stopping operating the ignition interface control program module; sending, by the voice conversion program module, the voice data signal to the voice module for unscrambling the voice data packet to acquire voice data indicating that the positive electrode and the negative electrode of the ignition clip are reversely connected; broadcasting the voice data through the loudspeaker; after the broadcasting, entering the standby state.

Preferably, the main circuit board of the automobile starting power supply is further provided with a battery over-discharging and over-charging protection circuit; the MCU main control chip IC6 collects the battery power of the storage battery in charging and discharging processes through the battery over-discharging and over-charging protection circuit, and the LED battery power display lamp is driven through the battery power monitoring program module to display the current battery power; in particular:

when the storage battery is in a power supplying state, if the battery power of the storage battery collected by the MCU main control chip IC6 is less than 13.3 V, it is determined that the battery power is low; at the moment, the battery power monitoring program module sends a fourth instruction signal to the voice conversion program module; after receiving the fourth instruction signal, the voice conversion program module sends the corresponding voice data signal to the voice module for unscrambling the voice data packet to acquire voice data indicating that the battery power is low; and the voice data is broadcast through the loudspeaker;

after the charging interface of the automobile starting power supply is connected to a charger, if the battery over-discharging and over-charging protection circuit collects that a current is input to the charging interface, the MCU main control chip IC6 determines that the automobile starting power supply enters a charging state; in the charging state, the MCU main control chip IC6 generates a fifth instruction signal and sends the fifth instruction signal to the ignition interface control program module, the AC interface control program module, and the voice conversion program module, respectively; after receiving the fifth instruction signal, the ignition interface control program module and the AC interface control program module are stopped to be operated; after receiving the fifth instruction signal, the voice conversion program module sends the corresponding voice data signal to the voice module for unscrambling the voice data packet to acquire voice data indicating the charging state; the voice data is broadcast through the loudspeaker;

when the battery over-discharging and over-charging protection circuit detects that the storage battery has been fully charged, the MCU main control chip IC6 determines that the automobile starting power supply is in a charging completion state; in the charging completion state, the MCU main control chip IC6 generates a sixth instruction signal and sends the sixth instruction signal to the voice conversion program module; after receiving the sixth instruction signal, the voice conversion program module sends the corresponding voice data signal to the voice module for unscrambling the voice data packet to acquire voice data indicating that the charging has been completed; and the voice data is broadcast through the loudspeaker.

Preferably, a timing program is further set in the MCU main control chip IC6; when the automobile starting power supply is in the startup state, and the ignition interface control program module is operated, the timing program is operated; within 5 minutes, if no ignition action occurs at the ignition output interface, the timing program controls the ignition interface control program module to be stopped to be operated.

Compared with the existing art, the present disclosure has the following beneficial effects.

By the arrangement of the wireless charging device, the ignition output interface, the USB output interface, the TYPE-C interface, the LED lighting assemblies, the AC output jack, and the loudspeaker, the automobile starting power supply can have ignition, USB charging, TYPE-C charging, wireless charging, lighting, and AC output functions at the same time; by the arrangement of the loudspeaker, the working states of all the components are broadcast via a voice in real time; in the operation process, a user can flexibly operate the automobile starting power supply according to the broadcast from the loudspeaker, so that the user uses the automobile starting power supply more safely and conveniently.

In the present disclosure, the ignition current detection circuit, the battery reverse charging current detection circuit, the ignition clip fall-off detection circuit, and the ignition output polarity reverse connection detection circuit are used to detect the work of the ignition output interface, so as to make corresponding voice broadcasts in time to remind the user of the current situation, and it is convenient for the user to take measures in time;

In the program control part of the automobile starting power supply, when the lighting lamp control buttons of the LED lighting assemblies on the two sides are pressed simultaneously for 5 seconds, a voice function can be enabled or disabled; when the automobile starting power supply is standby, the automobile starting power supply will enter the startup state if any button is pressed; in the meantime, the loudspeaker will broadcast a startup voice to prompt the user that the automobile starting power supply has been started; after the automobile starting power supply is started, the LED battery power display lamp displays the current battery power; corresponding functions are turned on when different buttons are pressed, and corresponding voice broadcasts are made, so that the user can operate the automobile starting power supply more effectively according to the voice broadcast prompts; furthermore, in the working state of the automobile starting power supply, corresponding detection and timing functions are added, so that when the automobile starting power supply fails or is not used in the startup state for a long time, the user is reminded of the current condition of the automobile starting power supply by means of voice broadcasting, and a reasonable action is automatically made, which enables the user to use the automobile starting power supply more efficiently and safely.

The additional aspects and advantages of the prevent disclosure will be provided in the following descriptions, part of which will become apparent from the following descriptions or be learned through the practice of the prevent disclosure.

BRIEF DESCRIPTION OF THE DRAWINGS

To describe the embodiments of the disclosure or the technical solutions in the existing art more clearly, drawings required to be used in the embodiments or the illustration of the existing art will be briefly introduced below. Obviously, the drawings in the illustration below are only some embodiments of the disclosure. Those ordinarily skilled in the art also can acquire other drawings according to the provided drawings without doing creative work.

Figure 1:
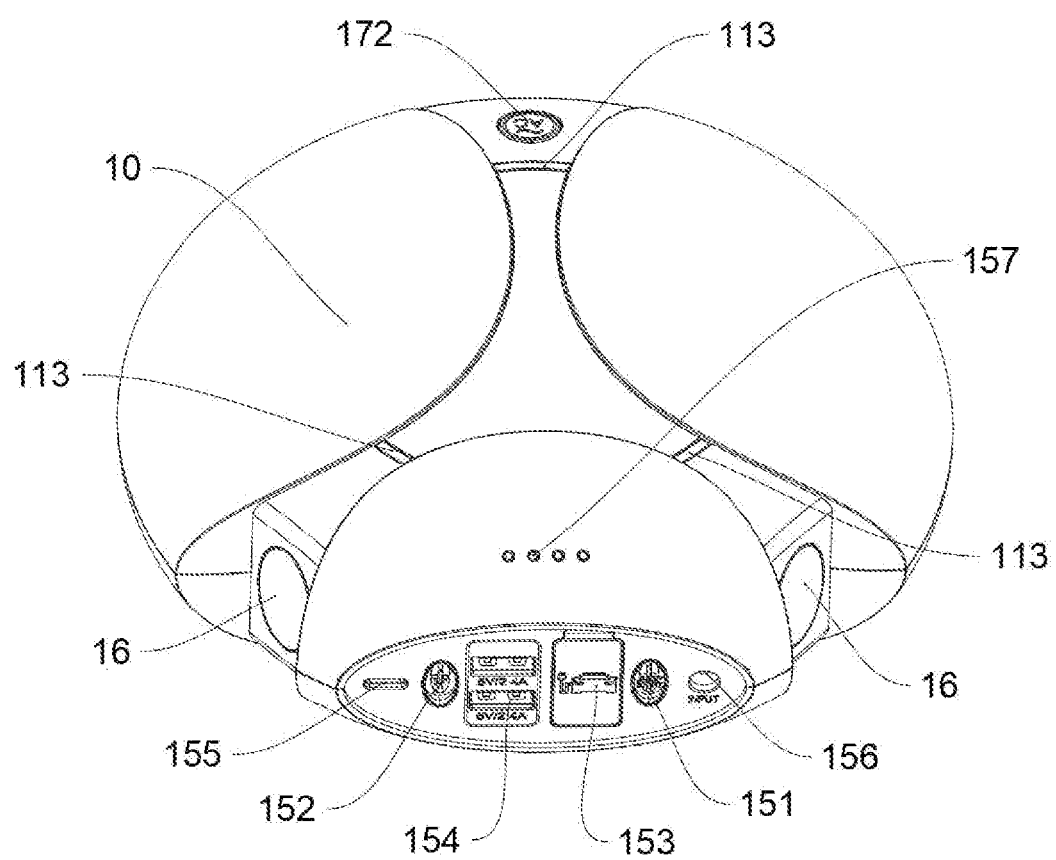
FIG. 1 is a schematic structural diagram of the present disclosure.

Reference signs and names in the drawings are as follows: shell 10, main circuit board 20, wireless charging device 11, storage battery 12, loudspeaker 13, mesh through hole 14, front operating table 15, LED lighting assembly 16, rear operating table 17, peripheral circuit 21, ignition current detection circuit 22, battery reverse charging current detection circuit 23, ignition clip fall-off detection circuit 24, ignition output polarity reverse connection detection circuit 25, battery over-discharging and over-charging protection circuit 26, voice module 27, button control program module 31, battery power monitoring program module 32, ignition interface control program module 33, AC interface control program module 34, charging interface control program module 35, lighting lamp control program module 36, voice conversion program module 37, ignition interface detection program module 38, timing program 39, upper circular cover 101, lower circular cover 102, left U-shaped fixture block 103, right U-shaped fixture block 104, rear U-shaped fixture block 105, wireless charging circuit board 111, wireless charging coil 112, wireless charging indicator lamp 113, ignition output control button 151, charging output control button 152, ignition output interface 153, USB output interface 154, TYPE-C interface 155, charging interface 156, LED battery power indicator lamp 157, LED circuit board 161, LED lighting lamp 162, lighting lamp control button 163, transparent hood 164, AC output jack 171, and AC output control button 172.

DETAILED DESCRIPTION OF THE EMBODIMENTS

The technical solutions in the embodiments of the present disclosure will be clearly and completely described below. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Referring to FIGS. 1-14, in the embodiments of the present disclosure, an automobile starting power supply with a voice prompt function includes a shell 10; a wireless charging device 11, a main circuit board 20, a storage battery 12, and a loudspeaker 13 are arranged inside the shell 10; the wireless charging device 11 is located at a top of the shell 10; the main circuit board 20 is arranged below the wireless charging device 11; the storage battery 12 is arranged below the main circuit board 20; a mesh through hole 14 is formed in one side of the shell 10; the loudspeaker 13 corresponds to the mesh through hole 14; a front side end of the shell 10 is provided with a front operating table 15; an ignition output control button 151, a charging output control button 152, an ignition output interface 153, a USB output interface 154, a TYPE-C interface 155, and a charging interface 156 are arranged in front of the front operating table 15; an upper end of the front operating table 15 is provided with an LED battery power display lamp 157; LED lighting assemblies 16 are respectively arranged on two sides of the shell 10 corresponding to the front operating table 15; a rear end of the shell 10 is provided with a rear operating table 17; an alternating current (AC) output jack 171 is arranged on a rear side of the rear operating table 17; an upper end of the rear operating table 17 is provided with an AC output control button 172; the wireless charging device 11, the storage battery 12, the loudspeaker 13, the ignition output control button 151, the charging output control button 152, the ignition output interface 153, the USB output interface 154, the TYPE-C interface 155, the charging interface 156, the LED battery power display lamp 157, the AC output jack 171, and the AC output control button 172 are all electrically connected to the main circuit board 20, so that the main circuit board 20 correspondingly broadcasts a state of the current automobile starting power supply through the loudspeaker 13.

In the above-mentioned technical solution, by the arrangement of the wireless charging device 11, the ignition output interface 153, the USB output interface 154, the TYPE-C interface 155, the LED lighting assemblies 16, the AC output jack 171, and the loudspeaker 13, the automobile starting power supply can have ignition, USB charging, TYPE-C charging, wireless charging, lighting, and AC output functions at the same time; by the arrangement of the loudspeaker 13, the working states of all the components are broadcast via a voice in real time; in the operation process, a user can flexibly operate the automobile starting power supply according to the broadcast from the loudspeaker 13, so that the user uses the automobile starting power supply more safely and conveniently.

Figure 2:
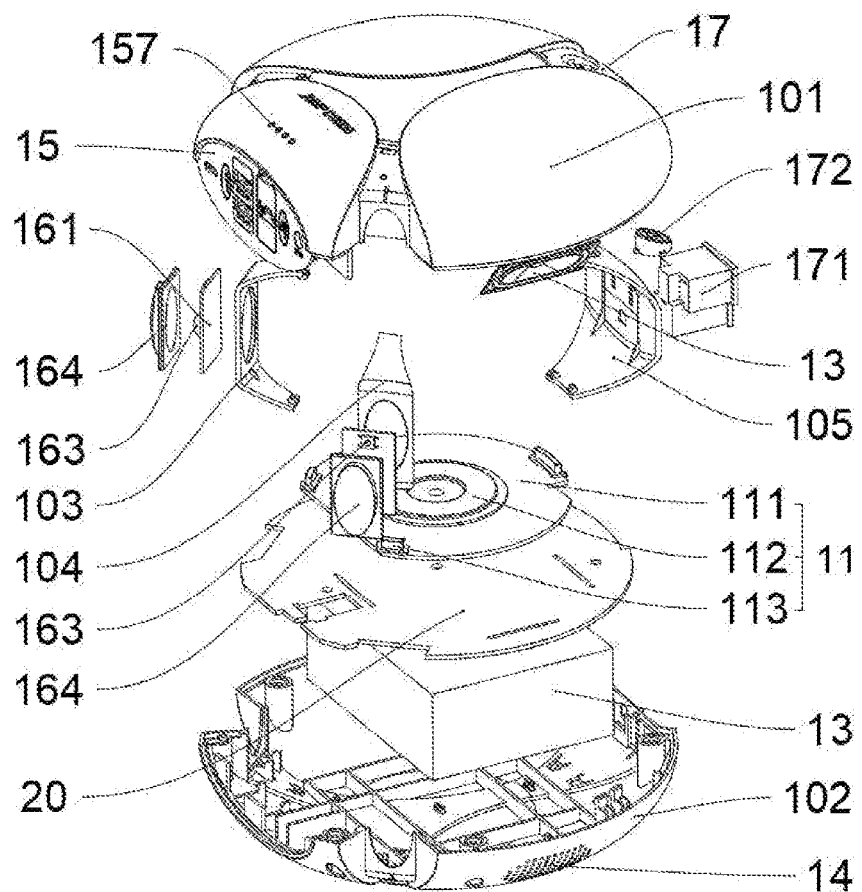
FIG. 2 is a structural exploded diagram of the present disclosure.

Further, as shown in FIGS. 1-2, in order to make the shell 10 firmer and more attractive, the shell 10 includes an upper circular cover 101, a lower circular cover 102, a left U-shaped fixture block 103, a right U-shaped fixture block 104, and a rear U-shaped fixture block 105; the upper circular cover 101 and the lower circular cover 102 are clamped for covering through the left U-shaped fixture block 103, the right U-shaped fixture block 104, and the rear U-shaped fixture block 105; the left U-shaped fixture block 103 and the right U-shaped fixture block 104 are respectively located on two sides of the front operating table 15; the two LED lighting assemblies 16 respectively pass through the left U-shaped fixture block 103 and the right U-shaped fixture block 104; the rear U-shaped fixture block 105 covers the rear operating table 17; and the AC output jack 171 and the AC output control button 172 both pass through the rear U-shaped fixture block 105.

Further, as shown in FIG. 2, the wireless charging device 11 includes a wireless charging circuit board 111; the wireless charging circuit board 111 is provided with a wireless charging coil 112 and three wireless charging indicator lamps 113 surrounding a periphery of the wireless charging coil 112; the wireless charging coil 112 is attached to an inner side of the upper circular cover 101; the wireless charging indicator lamps 113 protrude from the upper circular cover 101; and the three wireless charging indicator lamps 113 respectively press against the left U-shaped fixture block 103, the right U-shaped fixture block 104, and the rear U-shaped fixture block 105. When the wireless charging device 11 is operated, the wireless charging circuit board 111 will drive the three wireless charging indicator lamps 113 to be turned on to prompt that the wireless charging function has been enabled.

Further, as shown in FIG. 2, the LED lighting assemblies 16 include an LED circuit board 161 vertically mounted inside the shell 10, an LED lighting lamp 162 arranged on the LED circuit board 161, two lighting lamp control buttons 163 arranged on the LED circuit board 161, and a transparent hood 164 movably arranged on the shell 10 in a penetrating manner; the two lighting lamp control buttons 163 are respectively located at an upper part and a lower part of the LED circuit board 161; the LED lighting lamp 162 is located between the two lighting lamp control buttons 163; the transparent hood 164 corresponds to the LED lighting lamp 162; and an upper end and a lower end of the transparent hood 164 respectively press against the two lighting lamp control buttons 163. Therefore, the LED lighting lamp 162 and the lighting lamp control buttons 163 are combined into a whole. The LED lighting lamp 162 can be driven for displaying as long as the transparent hood 164 is pressed, so an effect of simulating an automobile lamp can be achieved.

Figure 3:
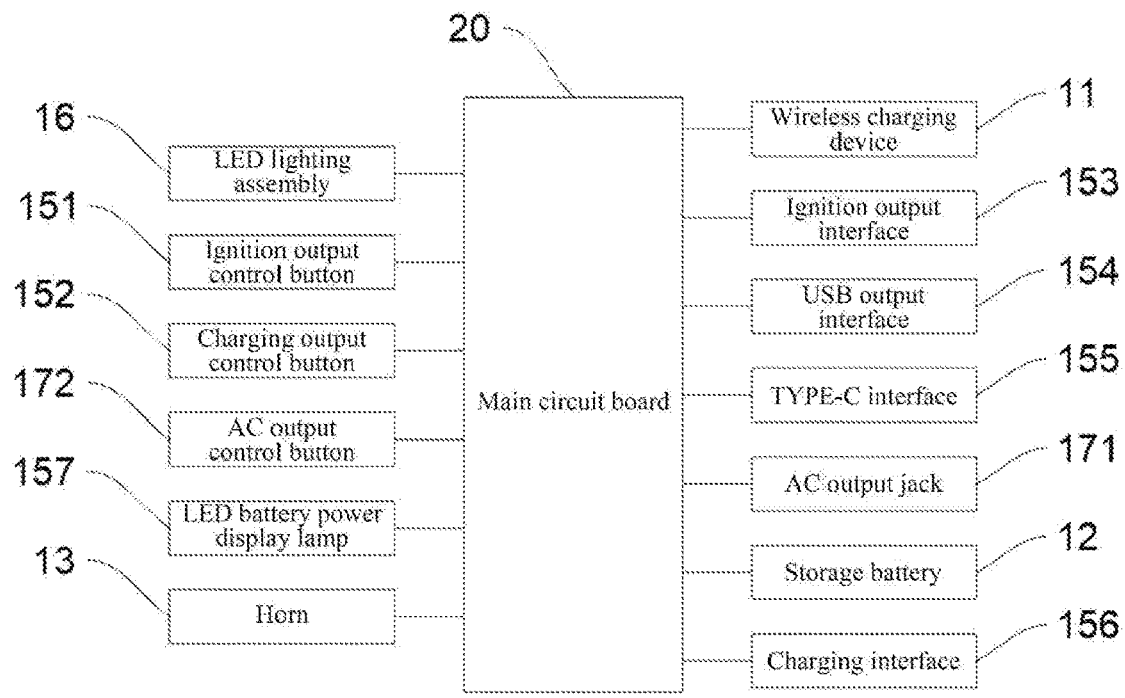
FIG. 3 is a circuit connection block diagram of a main circuit board and all parts in the present disclosure.

Further, as shown in FIGS. 2-3, the main circuit board 20 is provided with a micro processing unit (MCU) main control chip IC6 and a peripheral circuit 21 connected to the MCU main control chip IC6; the model number of the MCU main control chip IC6 is HT67F489; the ignition output control button 151, the charging output control button 152, the AC output control button 172, the lighting lamp control button 163, the charging interface 156, the storage battery 12, the ignition output interface 153, the AC output jack 171, the USB output interface 154, the TYPE-C interface 155, the wireless charging device 11, the LED lighting assemblies 16, the loudspeaker 13, and the LED battery power display lamp 157 are all electrically connected to the MCU main control chip IC6 through the peripheral circuit 21; and the various electronic elements can be controlled by the MCU main control chip IC6 to run.

Figure 4:
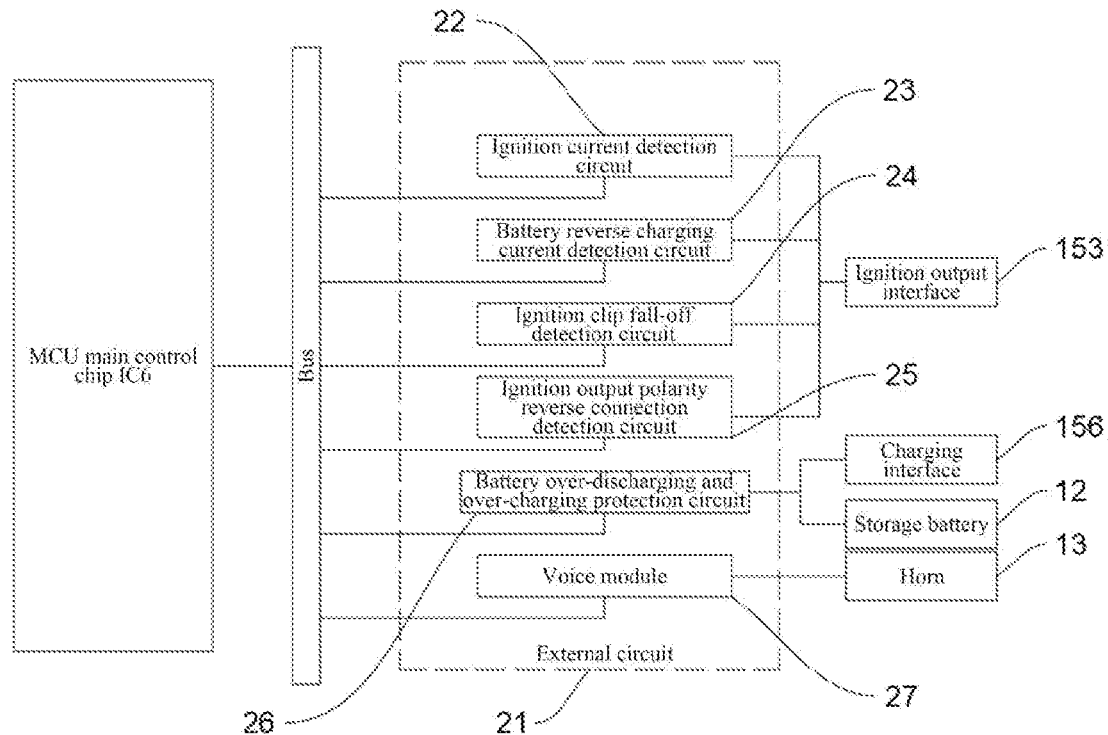
FIG. 4 is a circuit connection block diagram of a micro control unit (MCU) main control chip IC6 to an ignition output interface, a charging interface, a storage battery, and a loudspeaker through an external circuit in the present disclosure.

Further, as shown in FIGS. 2-4, the peripheral circuit 21 is provided with an ignition interface detection circuit, a battery protection circuit, and a voice control circuit; the ignition interface detection circuit is provided with an ignition current detection circuit 22 for determining whether an ignition action or overcurrent occurs at the ignition output interface 153, a battery reverse charging current detection circuit 23 for detecting whether a reverse charging current appears at the ignition output interface 153, an ignition clip fall-off detection circuit 24 for detecting whether the ignition clip falls off after the automobile is powered on, and an ignition output polarity reverse connection detection circuit 25 for detecting whether a positive polarity and a negative polarity of the ignition clip output are reversely connected; the battery protection circuit is provided with a battery over-discharging and over-charging protection circuit 26 for detecting over-charging when the storage battery 12 is charged or detecting over-discharging when the storage battery supplies power; the voice control circuit includes a voice module 27 with the model number of HFC071P17; the voice module 27 stores a voice data packet; the MCU main control chip IC6 receives signals generated by the ignition output control button 151, the charging output control button 152, the AC output control button 172, the lighting lamp control button 163, the ignition interface detection circuit, and the battery protection circuit, converts the signals into corresponding voice data signals, and sends the voice data signals to the voice module 27; and the voice module 27 unscrambles the corresponding voice data of the voice data packet according to the voice data signals and converts the voice data into a voice for playing through the loudspeaker 13.

After any button is pressed to enable the automobile starting power supply to enter the startup state, if the ignition output control button 151 is pressed, the automobile starting power supply turns on the ignition output interface 153 to enable an ignition function of the automobile starting power supply, and a corresponding voice is broadcast.

When a user connects the ignition clip to an automobile engine, the ignition current detection circuit 22, the battery reverse charging current detection circuit 23, the ignition clip fall-off detection circuit 24, and the ignition output polarity reverse connection detection circuit 25 are used to detect the work of the ignition output interface 153 in the present disclosure.

Figure 10:
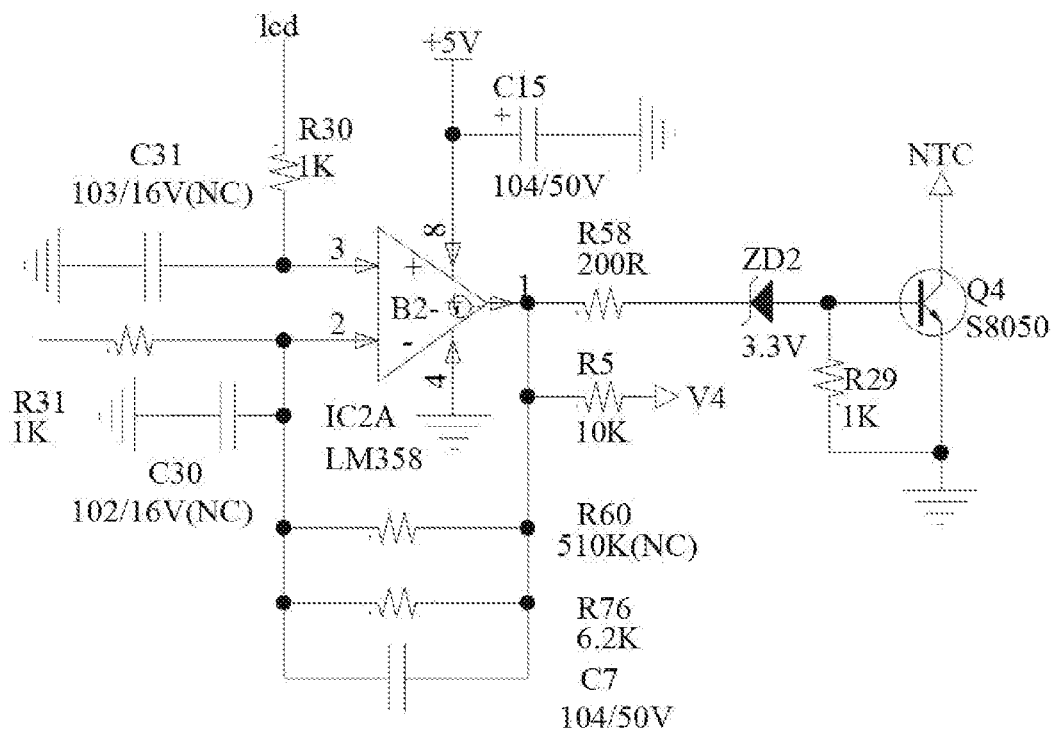
FIG. 10 is a schematic diagram of a circuit structure of an ignition current detection circuit in the present disclosure.

As shown in FIG. 10, illustrating one circuit implementation diagram of the ignition current detection circuit 22, the ignition current detection circuit 22 samples a voltage drop of two ends of a negative electrode electronic wire of the storage battery 12, and then sends an amplified voltage signal to the MCU main control chip IC6 through a dual operational amplifier, so as to determine whether an ignition action or overcurrent occurs at the ignition output interface 153.

Figure 11:
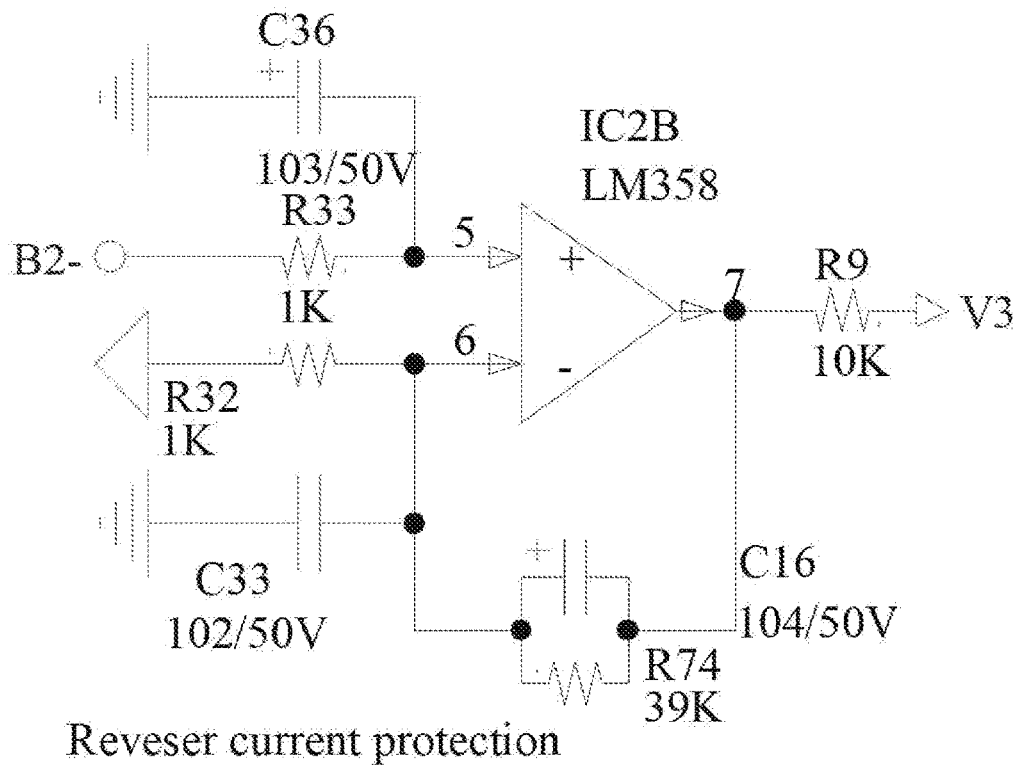
FIG. 11 is a schematic diagram of a circuit structure of a battery reverse charging current detection circuit in the present disclosure.

As shown in FIG. 11, illustrating one circuit implementation diagram of the battery reverse charging current detection circuit 23, after ignition succeeds, the automobile engine will reversely charge the storage battery 12 in the automobile starting power supply; the battery reverse charging current detection circuit 23 detects a reverse charging current through the dual operational amplifier; if the reverse charging current is too high, the battery reverse charging current detection circuit 23 sends the amplified voltage signal to the MCU main control chip IC6 through the dual operational amplifier and takes measures in time.

Figure 12:
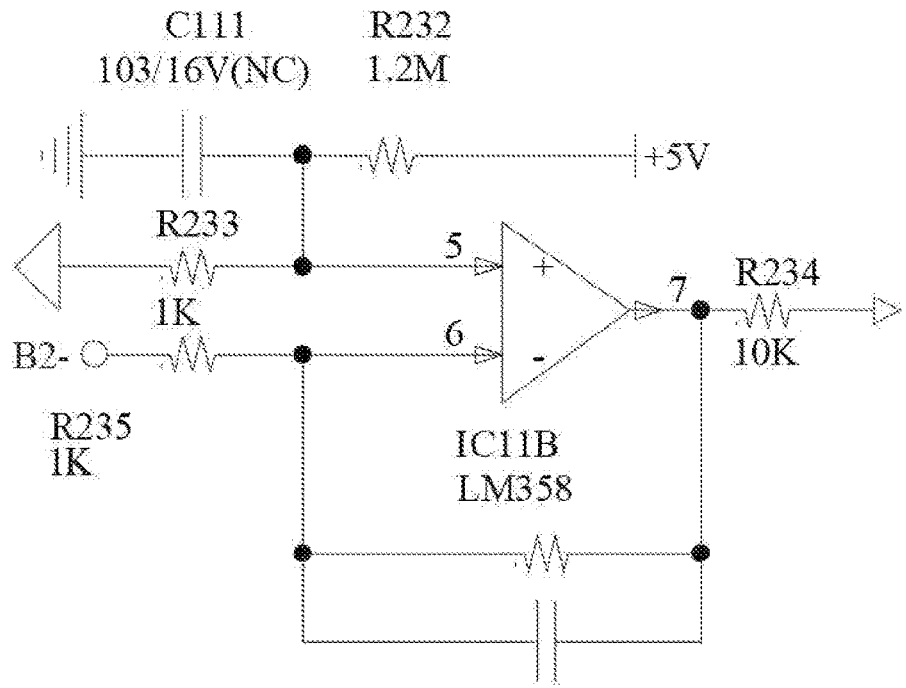
FIG. 12 is a schematic diagram of a circuit structure of an ignition clip fall-off detection circuit in the present disclosure.

As shown in FIG. 12, illustrating one circuit implementation diagram of the ignition clip fall-off detection circuit 24, the ignition clip fall-off detection circuit 24 also uses the dual operational amplifier to detect a magnitude of a current of an output wire of the storage battery 12 flowing through a negative wire, so as to determine whether the ignition clip falls off after it is connected to the automobile engine; when the ignition clip falls off, i.e., when the current of then output wire of the storage battery 12 flowing through the negative wire is less than a value set by the MCU main control chip IC6, it is determined that the ignition clip falls off, and a corresponding action is made in time.

Figure 13:
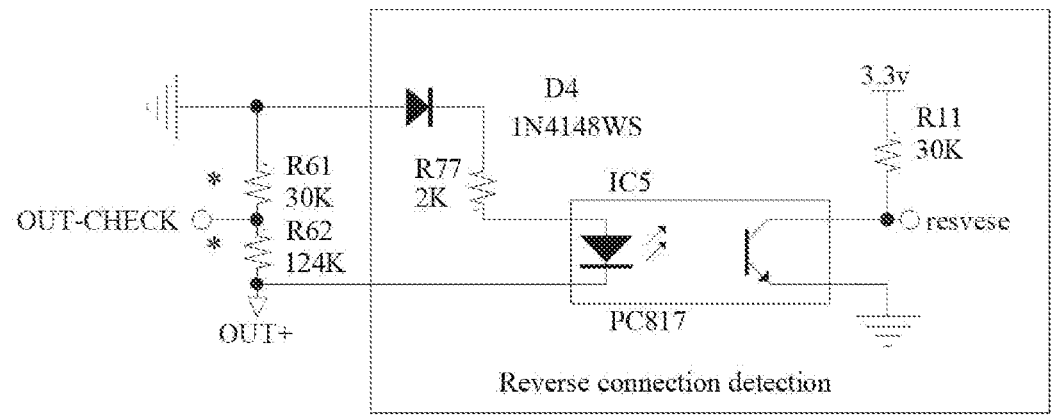
FIG. 13 is a schematic diagram of a circuit structure of an ignition output polarity reverse connection detection circuit in the present disclosure.
Figure 14:
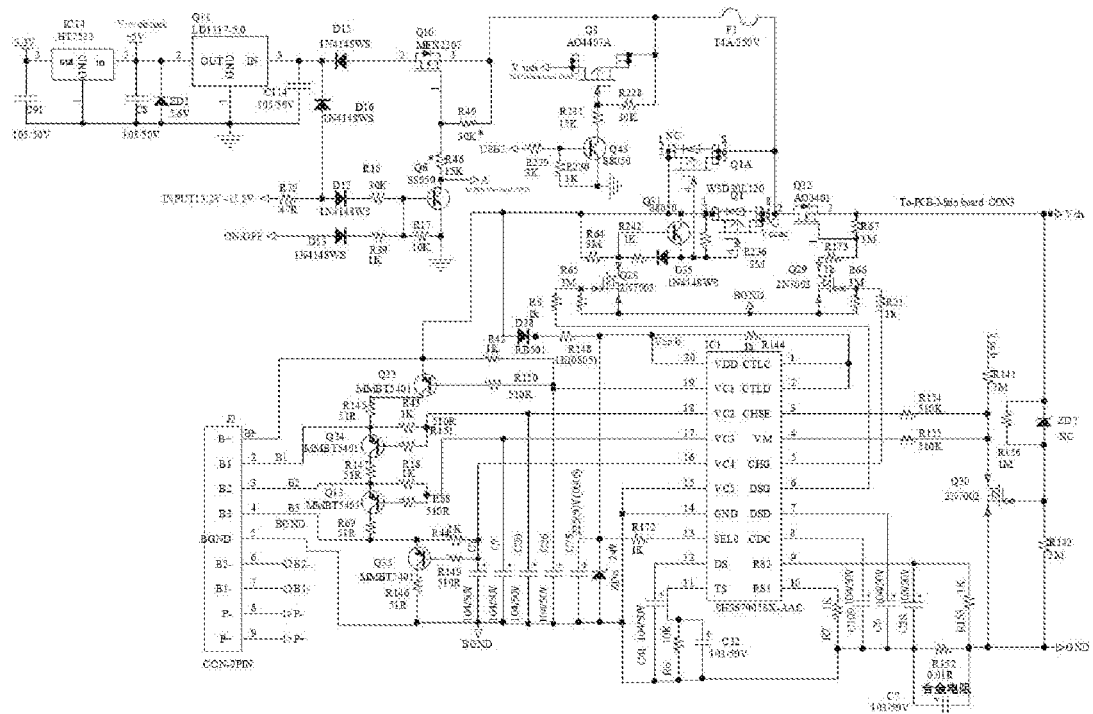
FIG. 14 is a schematic diagram of a circuit structure of a battery over-discharging and over-charging protection circuit in the present disclosure.

As shown in FIG. 13, illustrating one circuit implementation diagram of the ignition output polarity reverse connection detection circuit 25, a photoelectric coupler with the model number of PC817 is adopted. When the ignition clip has reverse polarities, the photoelectric coupler is forwards conducted to pull down a high-level pin of the MCU main control chip IC6 connected to the ignition output polarity reverse connection detection circuit 25, and it is determined that the ignition output polarities are reverse; and a corresponding action is made in time.

Figure 5:
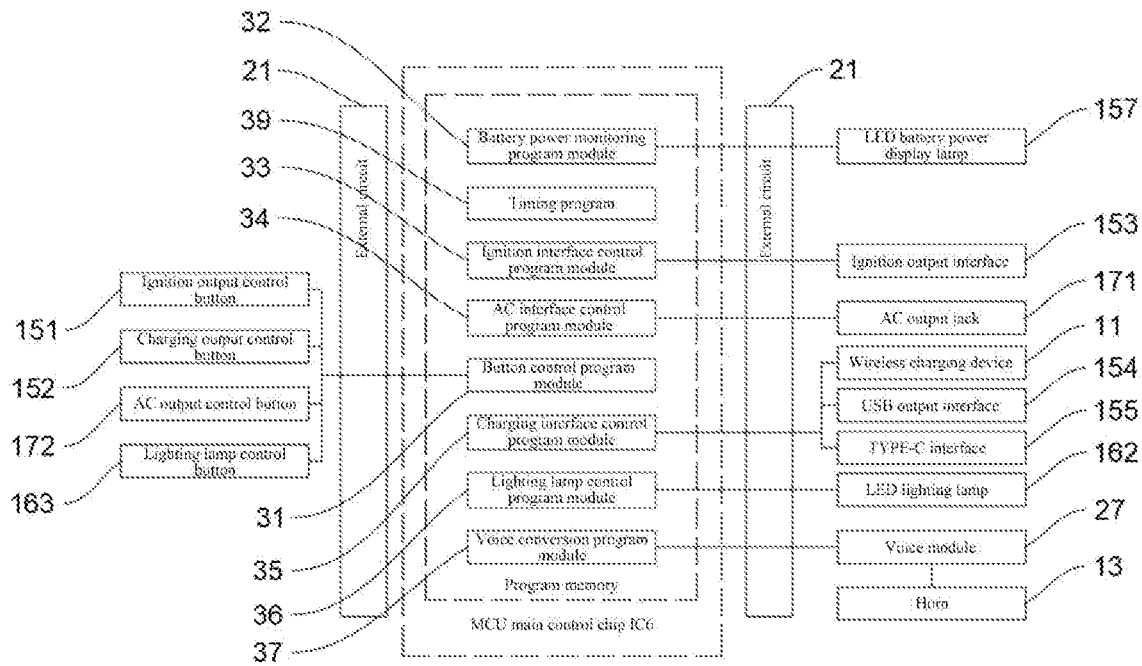
FIG. 5 is a circuit connection block diagram of an MCU main control chip IC6 to all parts through an external circuit in the present disclosure.
Figure 6:
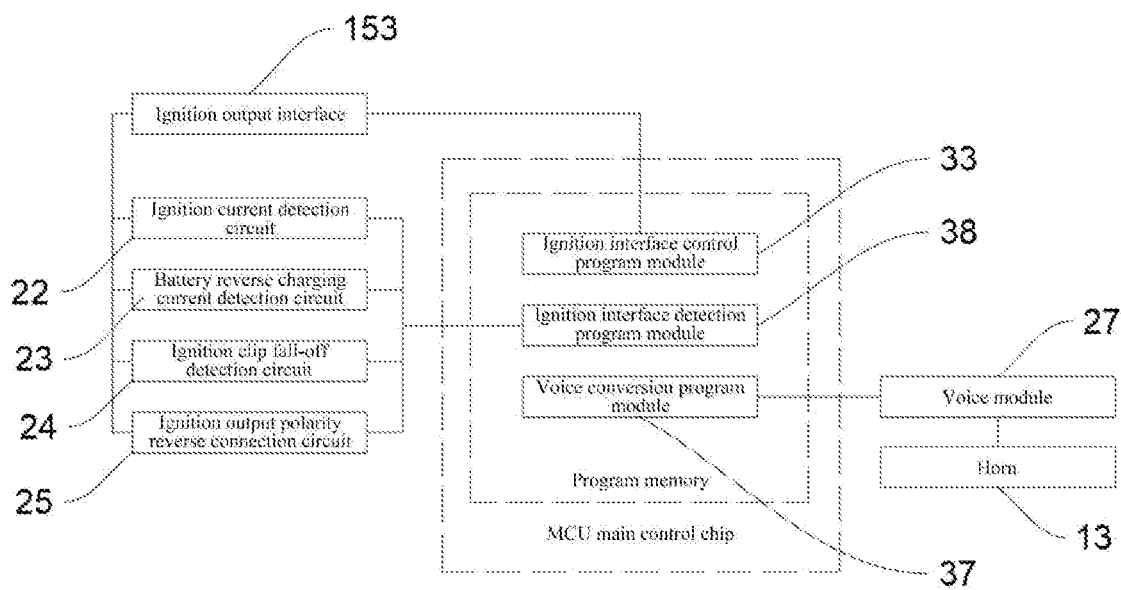
FIG. 6 is a connection block diagram of corresponding circuits and programs during operation of an ignition interface detection program module in the present disclosure.
Figure 7:
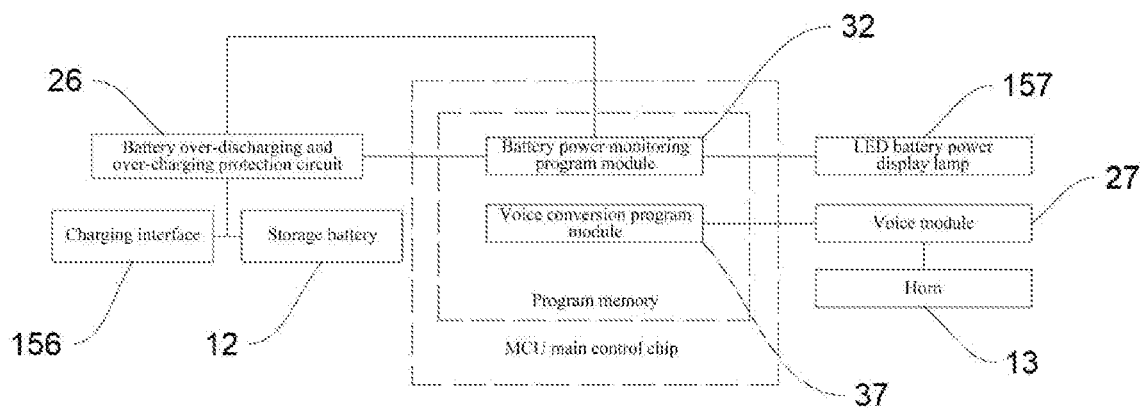
FIG. 7 is a connection block diagram of programs and circuits related to charging in the present disclosure.
Figure 8:
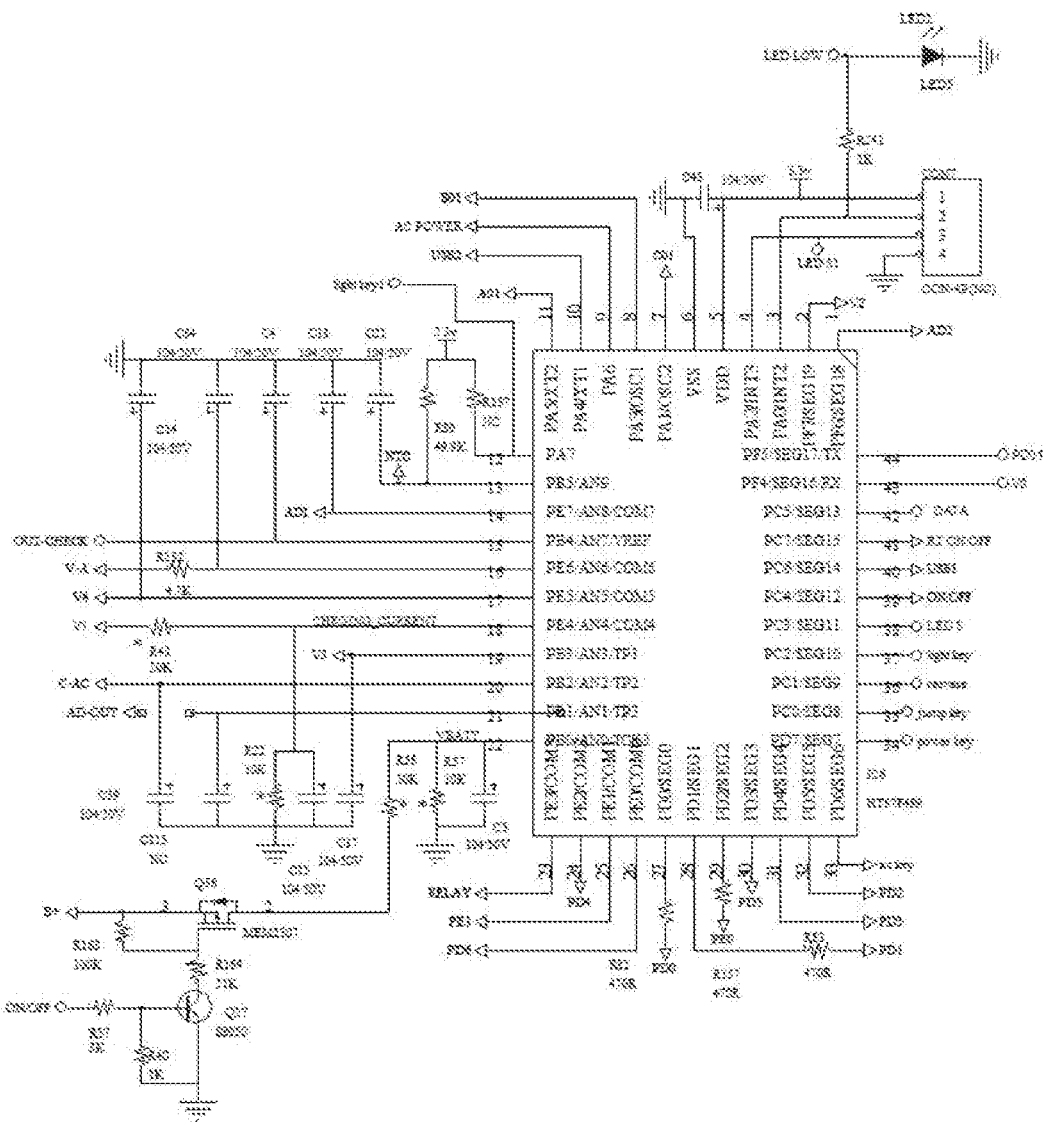
FIG. 8 is a schematic diagram of a circuit structure of an MCU main control chip IC6 in the present disclosure.
Figure 9:
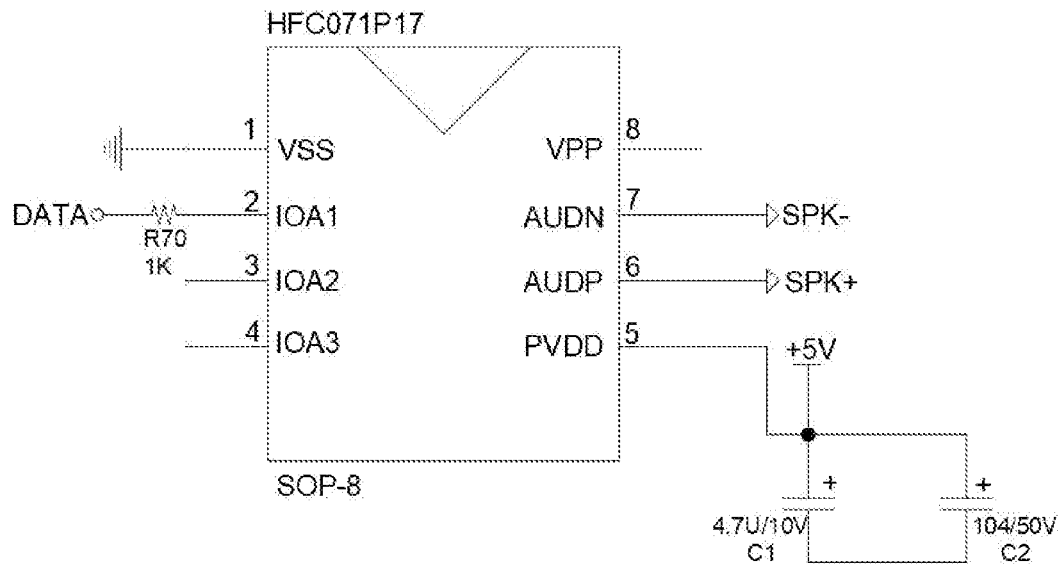
FIG. 9 is a schematic diagram of a circuit structure of a voice module in the present disclosure.

According to the above-mentioned structural design, the automobile starting power supply has the voice broadcasting function in addition to multiple functions. In order to further describe the safety and convenience of use of the automobile starting power supply after adding the voice broadcasting function, the following voice broadcast method will be specifically described:

As shown in FIGS. 5-7, a voice broadcast method of an automobile starting power supply involves an automobile starting power supply with a voice prompt function, and is implemented by a program loaded in the MCU main control chip IC6 and voice data stored in the voice module 27. The voice broadcast method includes the following steps:

step 1, the ignition output control button 151, the charging output control button 152, the AC output control button 172, and the light lamp control button 163 are set on the automobile starting power supply; the MCU main control chip IC6 is set on the main circuit board 20 of the automobile starting power supply; a program memory is set inside the MCU main control chip IC6; a button control program module 31, a battery power monitoring program module 32, an ignition interface control program module 33, an AC interface control program module 34, a charging interface control program module 35, a lighting lamp control program module 36, and a voice conversion program module 37 are loaded in the program memory, instructions of the various program modules being suitable for being loaded and operated by a processor;

step 2, the voice module 27 is set on the main control board 20 of the automobile starting power supply; a voice data packet is pre-stored in the voice module 27; the MCU main control chip IC6 performs data transmission through the voice conversion program module 37 and the voice module 27, and unscrambles the voice data packet;

step 3, the MCU main control chip IC6 identifies all the buttons through the button control program module 31; when the lighting lamp control buttons 163 corresponding to the two LED lighting assemblies 16 are pressed at the same time for 5 seconds, a first instruction signal is generated; the MCU main control chip IC6 controls the loudspeaker 13 to be turned on and turned off through a second instruction signal; when the voice conversion program module 37 is operated, the following steps are proceeded;

step 4, when the automobile starting power supply is in a standby state, any button is pressed at the first time to generate the second instruction signal, and the voice conversion program module 37 and the battery power monitoring program module 32 receive the second instruction signal, wherein after receiving the second instruction signal, the voice conversion program module 37 sends a voice data signal to the voice module 27 for unscrambling the voice data packet to acquire startup voice data, and the voice data is broadcast through the loudspeaker 13; after receiving the second instruction signal, the battery power monitoring program module 32 drives the LED battery power display lamp 157 to display the battery power of the current lithium storage battery 12 and completes a startup operation; in the meantime:

when the ignition output control button 151 is pressed, the second instruction signal drives the ignition interface control program module 33 to control the ignition output interface 153 to be turned on; furthermore, the voice conversion program module 37 sends a voice data signal again immediately after the voice data signal is sent; ignition starting voice data is unscrambled; the ignition starting voice data is broadcast through the loudspeaker 13 immediately after startup voice data is broadcast;

when the charging output control button 152 is pressed, the second instruction signal drives the charging interface control program module 35 to control the USB output interface 154, the TYPE-C interface 155, and the wireless charging device 11 to be turned on; furthermore, the voice conversion program module 37 sends a voice data signal again immediately after the voice data signal is sent; charging starting voice data is unscrambled; the charging starting voice data is broadcast through the loudspeaker 13 immediately after startup voice data is broadcast;

when the AC output control button 172 is pressed, the second instruction signal drives the AC interface control program module 34 to control the AC output jack 171 to be turned on; furthermore, the voice conversion program module 37 sends a voice data signal again immediately after the voice data signal is sent; AC starting voice data is unscrambled; the AC starting voice data is broadcast through the loudspeaker 13 immediately after startup voice data is broadcast;

when the lighting lamp control button 163 is pressed, the second instruction signal drives the lighting lamp control program module 36 to control the LED lighting assembly 16 to be turned on; furthermore, the voice conversion program module 37 sends a voice data signal again immediately after the voice data signal is sent; LED starting voice data is unscrambled; the LED starting voice data is broadcast through the loudspeaker 13 immediately after startup voice data is broadcast;

step 5, after the automobile starting power supply is in a startup state, any button is pressed, and a third instruction signal is generated, wherein:

when the ignition output control button 151 is pressed, the third instruction signal drives the ignition interface control program module 33 and the voice conversion program module 37; the ignition interface control program module 33 controls the ignition output interface 153 to be turned on; the voice conversion program module 37 sends the voice data signal to the voice module 27 for unscrambling the voice data packet to acquire voice data indicating ignition for starting; the voice data is broadcast through the loudspeaker 13;

when the charging output control button 152 is pressed, the third instruction signal drives the charging interface control program module 35 and the voice conversion program module 37; the charging interface control program module 35 controls the USB output interface 154, the TYPE-C interface 155, and the wireless charging device 11 to be turned on; the voice conversion program module 37 sends the voice data signal to the voice module 27 for unscrambling the voice data packet to acquire charging starting voice data; the voice data is broadcast through the loudspeaker 13;

when the AC output control button 172 is pressed, if the button pressed at the previous time is other button, the current third instruction signal drives the AC interface control program module 34 and the voice conversion program module 37; the AC interface control program module 34 controls the AC output jack 171 to be turned on; the voice conversion program module 37 sends the voice data signal to the voice module 27 for unscrambling the voice data packet to acquire AC starting voice data; the voice data is broadcast through the loudspeaker 13; if the button pressed at the previous time is also the AC output control button 172, the third instruction signal controls the automobile starting power supply to enter the standby state;

when the lighting lamp control button 163 is pressed, if the button pressed at the previous time is other button, the current third instruction signal drives the lighting lamp control program module 36 and the voice conversion program module 37; the lighting lamp control program module 36 controls the LED lighting assembly 16 to be turned on; the voice conversion program module 37 sends the voice data signal to the voice module 27 for unscrambling the voice data packet to acquire LED starting voice data; the voice data is broadcast through the loudspeaker 13; if the button pressed at the previous time is also the lighting lamp control button 163, the third instruction signal controls the automobile starting power supply to enter the standby state.

Further, as shown in FIG. 6, the setting of the ignition interface detection circuit on the main circuit board 20 of the automobile starting power supply to detect a state of the current automobile starting power supply includes the following steps:

step 1, in the ignition interface detection circuit, an ignition current detection circuit 22, a battery reverse charging current detection circuit 23, an ignition clip fall-off detection circuit 24, and an ignition output polarity reverse connection detection circuit 25 are set, and an ignition interface detection program module 38 is further loaded in the program memory of the MCU main control chip IC6, an instruction of the ignition interface detection program module 38 being suitable for being loaded and operated by the processor;

step 2, when the automobile starting power supply is in the startup state, and the ignition interface control program module 33 is operated, the ignition interface detection program module 38 is operated to drive the ignition current detection circuit 22, the battery reverse charging current detection circuit 23, the ignition clip fall-off detection circuit 24, and the ignition output polarity reverse connection detection circuit 25;

step 3, the ignition current detection circuit 22 samples a voltage drop of two ends of a negative electrode electronic wire of the storage battery 12, and sends an amplified voltage signal to the ignition interface detection program module 38 of the MCU main control chip IC6 for processing; if the ignition clip is connected successfully, the voice conversion program module 37 is controlled to send the voice data signal to the voice module 27 for unscrambling the voice data packet to acquire voice data indicating that the ignition clip is connected successfully, and the voice data is broadcast through the loudspeaker 13; after the ignition clip completes an ignition action, the voice conversion program module 37 is controlled to send the voice data signal to the voice module 27 for unscrambling the voice data packet to acquire voice data indicating that the ignition clip completes the ignition, and the voice data is broadcast through the loudspeaker 13; after the broadcasting, the ignition interface control program module 33 is stopped to be operated to enable the automobile starting power supply to enter the standby state; if the ignition clip does not complete the ignition action, the ignition interface detection program module 38 performs counting; when the ignition clip has not completed the ignition action for three continuous times, the voice conversion program module 37 sends the voice data signal to the voice module 27 for unscrambling the voice data packet to acquire voice data indicating that the ignition clip has not completed ignition, and the voice data is broadcast through the loudspeaker 13; after the broadcasting, the ignition interface control program module 33 is stopped to be operated, and it is set that the ignition interface control program module 33 is incapable of being driven by the second instruction signal and the third instruction signal within 5 minutes;

the battery reverse charging current detection circuit 23 detects whether the storage battery 12 in an automobile engine is reversely charged; when it is detected that a reverse charging current is too high, the ignition interface control program module 33 is stopped to be operated; the voice conversion program module 37 sends the voice data signal to the voice module 27 for unscrambling the voice data packet to acquire voice data indicating that the reverse charging current is too high; the voice data is broadcast through the loudspeaker 13; after the broadcasting, the standby state is proceeded;

the ignition clip fall-off detection circuit 24 detects a magnitude of a current of an output wire of the storage battery 12 flowing through a negative wire; when an external voltage is close to or greater than a voltage of the storage battery 12 of the product, and an ignition output current is less than 3 A±0.3 A, it is determined that the clip falls off; when it is determined that the clip falls off, the ignition interface control program module 33 drives the ignition output interface 153 to be turned on for 3 seconds and turned off for 0.5 second, and such operation is repeated for 5 minutes to stop operating the ignition interface control program module 33; the voice conversion program module 37 sends the voice data signal to the voice module 27 for unscrambling the voice data packet to acquire voice data indicating that the clip falls off, and the voice data is broadcast through the loudspeaker 13; after the broadcasting, the standby state is proceeded; when it is detected that the clip falls off, the ignition interface control program module 33 is stopped to be operated within 3 seconds; the voice conversion program module 37 sends the voice data signal to the voice module 27 for unscrambling the voice data packet to acquire voice data indicating that the clip falls off, and the voice data is broadcast through the loudspeaker 13; after the broadcasting, the standby state is proceeded;

the ignition output polarity reverse connection detection circuit 25 detects whether a positive electrode and a negative electrode of the ignition clip are reversely connected; when the positive electrode and the negative electrode of the ignition clip are reversely connected, the ignition interface control program module 33 is stopped to be operated; the voice conversion program module 37 sends the voice data signal to the voice module 27 for unscrambling the voice data packet to acquire voice data indicating that the positive electrode and the negative electrode of the ignition clip are reversely connected; the voice data is broadcast through the loudspeaker 13; after the broadcasting, the standby state is proceeded.

Further, as shown in FIG. 7, the main circuit board 20 of the automobile starting power supply is further provided with a battery over-discharging and over-charging protection circuit 26; the MCU main control chip IC6 collects the battery power of the storage battery 12 in charging and discharging processes through the battery over-discharging and over-charging protection circuit 26, and the LED battery power display lamp 157 is driven through the battery power monitoring program module 32 to display the current battery power; in particular:

when the storage battery 12 is in a power supplying state, if the battery power of the storage battery 12 collected by the MCU main control chip IC6 is less than 13.3 V, it is determined that the battery power is low; at the moment, the battery power monitoring program module 32 sends a fourth instruction signal to the voice conversion program module 37; after receiving the fourth instruction signal, the voice conversion program module 37 sends the corresponding voice data signal to the voice module 27 for unscrambling the voice data packet to acquire voice data indicating that the battery power is low; and the voice data is broadcast through the loudspeaker 13;

after the charging interface 156 of the automobile starting power supply is connected to a charger, if the battery over-discharging and over-charging protection circuit 26 collects that a current is input to the charging interface 156, the MCU main control chip IC6 determines that the automobile starting power supply enters a charging state; in the charging state, the MCU main control chip IC6 generates a fifth instruction signal and sends the fifth instruction signal to the ignition interface control program module 33, the AC interface control program module 34, and the voice conversion program module 37, respectively; after receiving the fifth instruction signal, the ignition interface control program module 33 and the AC interface control program module 34 are stopped to be operated; after receiving the fifth instruction signal, the voice conversion program module 37 sends the corresponding voice data signal to the voice module 27 for unscrambling the voice data packet to acquire voice data indicating the charging state; the voice data is broadcast through the loudspeaker 13;

when the battery over-discharging and over-charging protection circuit 26 detects that the storage battery 12 has been fully charged, the MCU main control chip IC6 determines that the automobile starting power supply is in a charging completion state; in the charging completion state, the MCU main control chip IC6 generates a sixth instruction signal and sends the sixth instruction signal to the voice conversion program module 37; after receiving the sixth instruction signal, the voice conversion program module 37 sends the corresponding voice data signal to the voice module 27 for unscrambling the voice data packet to acquire voice data indicating that the charging has been completed; and the voice data is broadcast through the loudspeaker 13.

Further, as shown in FIG. 5, a timing program 39 is further set in the MCU main control chip IC6; when the automobile starting power supply is in the startup state, and the ignition interface control program module 33 is operated, the timing program 39 is operated; within 5 minutes, if no ignition action occurs at the ignition output interface 153, the timing program 39 controls the ignition interface control program module 33 to be stopped to be operated.

In the above-mentioned technical solution, when the lighting lamp control buttons 163 of the LED lighting assemblies 16 on the two sides are pressed simultaneously for 5 seconds, a voice function can be enabled or disabled; when the automobile starting power supply is standby, the automobile starting power supply will enter the startup state if any button is pressed; in the meantime, the loudspeaker 13 will broadcast a startup voice to prompt the user that the automobile starting power supply has been started; after the automobile starting power supply is started, the LED battery power display lamp 157 displays the current battery power; if the battery power is low, the system may control the loudspeaker 13 to broadcast a voice prompt of low battery power, and in the meantime, the automobile starting power supply is turned off; for the ignition output interface 153, the ignition current detection circuit 22, the battery reverse charging current detection circuit 23, the ignition clip fall-off detection circuit 24, and the ignition output polarity reverse connection detection circuit 25 are adopted to detect the work of the ignition output interface 153; in case of a normal operation, a faulty operation, or a fault, corresponding voices can be broadcast through the loudspeaker 13 to remind the user of taking corresponding measures in time; after the ignition output interface 153 is turned on, a timing function is further set; within 5 minutes, if no ignition action occurs at the ignition output interface 153, the ignition output interface 153 is turned off; for the wireless charging device 11, the USB output interface 154, the TYPE-C interface 155, the LED lighting assemblies 16, and the AC output jack 171, the main circuit board 20 can also control the loudspeaker 13 to broadcast their on states and off states via a voice; when the automobile starting power supply is charged, connection, powering on, and charging completion of the charging interface 156 can all be broadcast correspondingly via a voice.

For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure.

What is claimed is:

1. An automobile starting power supply with a voice prompt function, comprising a shell, wherein a wireless charging device, a main circuit board, a storage battery, and a loudspeaker are arranged inside the shell; the wireless charging device is located at a top of the shell; the main circuit board is arranged below the wireless charging device; the storage battery is arranged below the main circuit board; a mesh through hole is formed in one side of the shell; the loudspeaker corresponds to the mesh through hole; a front side end of the shell is provided with a front operating table; an ignition output control button, a charging output control button, an ignition output interface, a USB output interface, a TYPE-C interface, and a charging interface are arranged in front of the front operating table; an upper end of the front operating table is provided with an LED battery power display lamp; LED lighting assemblies are respectively arranged on two sides of the shell corresponding to the front operating table; a rear end of the shell is provided with a rear operating table; an alternating current (AC) output jack is arranged on a rear side of the rear operating table; an upper end of the rear operating table is provided with an AC output control button; the wireless charging device, the storage battery, the loudspeaker, the ignition output control button, the charging output control button, the ignition output interface, the USB output interface, the TYPE-C interface, the charging interface, the LED battery power display lamp, the AC output jack, and the AC output control button are all electrically connected to the main circuit board, so that the main circuit board correspondingly broadcasts a state of the current automobile starting power supply through the loudspeaker;

wherein the shell comprises an upper circular cover, a lower circular cover, a left U-shaped fixture block, a right U-shaped fixture block, and a rear U-shaped fixture block; the upper circular cover and the lower circular cover are clamped for covering through the left U-shaped fixture block, the right U-shaped fixture block, and the rear U-shaped fixture block; the left U-shaped fixture block and the right U-shaped fixture block are respectively located on two sides of the front operating table; the two LED lighting assemblies respectively pass through the left U-shaped fixture block and the right U-shaped fixture block; the rear U-shaped fixture block covers the rear operating table; and the AC output jack and the AC output control button both pass through the rear U-shaped fixture block.

2. The automobile starting power supply with the voice prompt function according to claim 1, wherein the wireless charging device comprises a wireless charging circuit board; the wireless charging circuit board is provided with a wireless charging coil and three wireless charging indicator lamps surrounding a periphery of the wireless charging coil; the wireless charging coil is attached to an inner side of the upper circular cover; the wireless charging indicator lamps protrude from the upper circular cover; and the three wireless charging indicator lamps respectively press against the left U-shaped fixture block, the right U-shaped fixture block, and the rear U-shaped fixture block.

3. The automobile starting power supply with the voice prompt function according to claim 1, wherein the LED lighting assemblies comprise an LED circuit board vertically mounted inside the shell, an LED lighting lamp arranged on the LED circuit board, two lighting lamp control buttons arranged on the LED circuit board, and a transparent hood movably arranged on the shell in a penetrating manner; the two lighting lamp control buttons are respectively located at an upper part and a lower part of the LED circuit board; the LED lighting lamp is located between the two lighting lamp control buttons; the transparent hood corresponds to the LED lighting lamp; and an upper end and a lower end of the transparent hood respectively press against the two lighting lamp control buttons.

4. The automobile starting power supply with the voice prompt function according to claim 3, wherein the main circuit board is provided with a micro processing unit (MCU) main control chip IC6 and a peripheral circuit connected to the MCU main control chip IC6; the model number of the MCU main control chip IC6 is HT67F489; the ignition output control button, the charging output control button, the AC output control button, the lighting lamp control button, the charing interface, the storage battery, the ignition output interface, the AC output jack, the USB output interface, the TYPE-C interface, the wireless charging device, the LED lighting assemblies, the loudspeaker, and the LED battery power display lamp are all electrically connected to the MCU main control chip IC6 through the peripheral circuit; and the various electronic elements can be controlled by the MCU main control chip IC6 to run.

5. The automobile starting power supply with the voice prompt function according to claim 4, wherein the peripheral circuit is provided with an ignition interface detection circuit, a battery protection circuit, and a voice control circuit; the ignition interface detection circuit is provided with an ignition current detection circuit for determining whether an ignition action or overcurrent occurs at the ignition output interface, a battery reverse charging current detection circuit for detecting whether a reverse charging current appears at the ignition output interface, an ignition clip fall-off detection circuit for detecting whether the ignition clip falls off after the automobile is powered on, and an ignition output polarity reverse connection detection circuit for detecting whether a positive polarity and a negative polarity of the ignition clip output are reversely connected; the battery protection circuit is provided with a battery over-discharging/over-charging protection circuit for detecting over-charging when the storage battery is charged or detecting over-discharging when the storage battery supplies power; the voice control circuit comprises a voice module with the model number of HFC071P17; the voice module stores a voice data packet; the MCU main control chip IC6 receives signals generated by the ignition output control button, the charging output control button, the AC output control button, the lighting lamp control button, the ignition interface detection circuit, and the battery protection circuit, converts the signals into corresponding voice data signals, and sends the voice data signals to the voice module; and the voice module unscrambles the corresponding voice data of the voice data packet according to the voice data signals and converts the voice data into a voice for playing through the loudspeaker.

6. A voice broadcast method of an automobile starting power supply, involving the automobile starting power supply with a voice prompt function according to claim 1 and implemented by a program loaded in the MCU main control chip IC6 and voice data stored in a voice module, wherein the voice broadcast method comprises the following steps:

step 1, setting the ignition output control button, the charging output control button, the AC output control button, and the light lamp control button on the automobile starting power supply, setting the MCU main control chip IC6 on the main circuit board of the automobile starting power supply, setting a program memory inside the MCU main control chip IC6, and loading a button control program module, a battery power monitoring program module, an ignition interface control program module, an AC interface control program module, a charging interface control program module, a lighting lamp control program module, and a voice conversion program module in the program memory, instructions of the various program modules being suitable for being loaded and operated by a processor;

step 2, setting the voice module on the main control board of the automobile starting power supply, pre-storing a voice data packet in the voice module, performing, by the MCU main control chip IC6, data transmission through the voice conversion program module and the voice module, and unscrambling the voice data packet;

step 3, identifying, by the MCU main control chip IC6, all the buttons through the button control program module; generating, when the lighting lamp control buttons corresponding to the two LED lighting assemblies are pressed at the same time for 5 seconds, a first instruction signal; controlling, by the MCU main control chip IC6, the loudspeaker to be turned on and turned off through a second instruction signal; when the voice conversion program module is operated, proceeding to the following steps;

step 4, when the automobile starting power supply is in a standby state, pressing any button at the first time to generate the second instruction signal, and receiving, by the voice conversion program module and the battery power monitoring program module, the second instruction signal, wherein after receiving the second instruction signal, the voice conversion program module sends a voice data signal to the voice module for unscrambling the voice data packet to acquire startup voice data, and the voice data is broadcast through the loudspeaker; after receiving the second instruction signal, the battery power monitoring program module drives the LED battery power display lamp to display the battery power of the current lithium storage battery and completes a startup operation; in the meantime:

when the ignition output control button is pressed, the second instruction signal drives the ignition interface control program module to control the ignition output interface to be turned on; furthermore, the voice conversion program module sends a voice data signal again immediately after the voice data signal is sent; ignition starting voice data is unscrambled; the ignition starting voice data is broadcast through the loudspeaker immediately after startup voice data is broadcast;

when the charging output control button is pressed, the second instruction signal drives the charging interface control program module to control the USB output interface, the TYPE-C interface, and the wireless charging device to be turned on; furthermore, the voice conversion program module sends a voice data signal again immediately after the voice data signal is sent; charging starting voice data is unscrambled; the charging starting voice data is broadcast through the loudspeaker immediately after startup voice data is broadcast;

when the AC output control button is pressed, the second instruction signal drives the AC interface control program module to control the AC output jack to be turned on; furthermore, the voice conversion program module sends a voice data signal again immediately after the voice data signal is sent; AC starting voice data is unscrambled; the AC starting voice data is broadcast through the loudspeaker immediately after startup voice data is broadcast;

when the lighting lamp control button is pressed, the second instruction signal drives the lighting lamp control program module to control the LED lighting assembly to be turned on; furthermore, the voice conversion program module sends a voice data signal again immediately after the voice data signal is sent; LED starting voice data is unscrambled; the LED starting voice data is broadcast through the loudspeaker immediately after startup voice data is broadcast;

step 5, after the automobile starting power supply is in a startup state, pressing any button, and generating a third instruction signal, wherein:

when the ignition output control button is pressed, the third instruction signal drives the ignition interface control program module and the voice conversion program module; the ignition interface control program module controls the ignition output interface to be turned on; the voice conversion program module sends the voice data signal to the voice module for unscrambling the voice data packet to acquire voice data indicating ignition for starting; the voice data is broadcast through the loudspeaker;

when the charging output control button is pressed, the third instruction signal drives the charging interface control program module and the voice conversion program module; the charging interface control program module controls the USB output interface, the TYPE-C interface, and the wireless charging device to be turned on; the voice conversion program module sends the voice data signal to the voice module for unscrambling the voice data packet to acquire charging starting voice data; the voice data is broadcast through the loudspeaker;

when the AC output control button is pressed, if the button pressed at the previous time is other button, the current third instruction signal drives the AC interface control program module and the voice conversion program module; the AC interface control program module controls the AC output jack to be turned on; the voice conversion program module sends the voice data signal to the voice module for unscrambling the voice data packet to acquire AC starting voice data; the voice data is broadcast through the loudspeaker; if the button pressed at the previous time is also the AC output control button, the third instruction signal controls the automobile starting power supply to enter the standby state;

when the lighting lamp control button is pressed, if the button pressed at the previous time is other button, the current third instruction signal drives the lighting lamp control program module and the voice conversion program module; the lighting lamp control program module controls the LED lighting assembly to be turned on; the voice conversion program module sends the voice data signal to the voice module for unscrambling the voice data packet to acquire LED starting voice data; the voice data is broadcast through the loudspeaker; if the button pressed at the previous time is also the lighting lamp control button, the third instruction signal controls the automobile starting power supply to enter the standby state.

7. The voice broadcast method of the automobile starting power supply according to claim 6, wherein the setting the ignition interface detection circuit on the main circuit board of the automobile starting power supply to detect a state of the current automobile starting power supply comprises the following steps:

step 1, in the ignition interface detection circuit, setting an ignition current detection circuit, a battery reverse charging current detection circuit, an ignition clip fall-off detection circuit, and an ignition output polarity reverse connection detection circuit, and loading an ignition interface detection program module in the program memory of the MCU main control chip IC6, an instruction of the ignition interface detection program module being suitable for being loaded and operated by the processor;

step 2, when the automobile starting power supply is in the startup state, and the ignition interface control program module is operated, operating the ignition interface detection program module to drive the ignition current detection circuit, the battery reverse charging current detection circuit, the ignition clip fall-off detection circuit, and the ignition output polarity reverse connection detection circuit;

step 3, sampling, by the ignition current detection circuit, a voltage drop of two ends of a negative electrode electronic wire of the storage battery; sending an amplified voltage signal to the ignition interface detection program module of the MCU main control chip IC6 for processing; if the ignition clip is connected successfully, controlling the voice conversion program module to send the voice data signal to the voice module for unscrambling the voice data packet to acquire voice data indicating that the ignition clip is connected successfully, and broadcasting the voice data through the loudspeaker; after the ignition clip completes an ignition action, controlling the voice conversion program module to send the voice data signal to the voice module for unscrambling the voice data packet to acquire voice data indicating that the ignition clip completes the ignition, and broadcasting the voice data through the loudspeaker; after the broadcasting, stopping operating the ignition interface control program module to enable the automobile starting power supply to enter the standby state; if the ignition clip does not complete the ignition action, performing, by the ignition interface detection program module, counting; when the ignition clip has not completed the ignition action for three continuous times, sending, by the voice conversion program module, the voice data signal to the voice module for unscrambling the voice data packet to acquire voice data indicating that the ignition clip has not completed ignition, and broadcasting the voice data through the loudspeaker; after the broadcasting, stopping operating the ignition interface control program module, and setting that the ignition interface control program module is incapable of being driven by the second instruction signal and the third instruction signal within 5 minutes;

detecting, by the battery reverse charging current detection circuit, whether the storage battery in an automobile engine is reversely charged; when it is detected that a reverse charging current is too high, stopping operating the ignition interface control program module; sending, by the voice conversion program module, the voice data signal to the voice module for unscrambling the voice data packet to acquire voice data indicating that the reverse charging current is too high; broadcasting the voice data through the loudspeaker; after the broadcasting, entering the standby state;

detecting, by the ignition clip fall-off detection circuit, a magnitude of a current of an output wire of the storage battery flowing through a negative wire; when an external voltage is close to or greater than a voltage of the storage battery of the product, and an ignition output current is less than 3 A±0.3 A, determining that the clip falls off; when it is determined that the clip falls off, driving, by the ignition interface control program module, the ignition output interface to be turned on for 3 seconds and turned off for 0.5 second, repeating such operation for 5 minutes to stop operating the ignition interface control program module; sending, by the voice conversion program module, the voice data signal to the voice module for unscrambling the voice data packet to acquire voice data indicating that the clip falls off, and broadcasting the voice data through the loudspeaker; after the broadcasting, entering the standby state; when it is detected that the clip falls off, stopping operating the ignition interface control program module within 3 seconds; sending, by the voice conversion program module, the voice data signal to the voice module for unscrambling the voice data packet to acquire voice data indicating that the clip falls off, and broadcasting the voice data through the loudspeaker; after the broadcasting, entering the standby state;

detecting, by the ignition output polarity reverse connection detection circuit, whether a positive electrode and a negative electrode of the ignition clip are reversely connected; when the positive electrode and the negative electrode of the ignition clip are reversely connected, stopping operating the ignition interface control program module; sending, by the voice conversion program module, the voice data signal to the voice module for unscrambling the voice data packet to acquire voice data indicating that the positive electrode and the negative electrode of the ignition clip are reversely connected; broadcasting the voice data through the loudspeaker; after the broadcasting, entering the standby state.

8. The voice broadcast method of the automobile starting power supply according to claim 6, wherein the main circuit board of the automobile starting power supply is further provided with a battery over-discharging and over-charging protection circuit; the MCU main control chip IC6 collects the battery power of the storage battery in charging and discharging processes through the battery over-discharging and over-charging protection circuit, and the LED battery power display lamp is driven through the battery power monitoring program module to display the current battery power, wherein when the storage battery is in a power supplying state, if the battery power of the storage battery collected by the MCU main control chip IC6 is less than 13.3 V, it is determined that the battery power is low; at the moment, the battery power monitoring program module sends a fourth instruction signal to the voice conversion program module; after receiving the fourth instruction signal, the voice conversion program module sends the corresponding voice data signal to the voice module for unscrambling the voice data packet to acquire voice data indicating that the battery power is low; and the voice data is broadcast through the loudspeaker;

after the charging interface of the automobile starting power supply is connected to a charger, if the battery over-discharging and over-charging protection circuit collects that a current is input to the charging interface, the MCU main control chip IC6 determines that the automobile starting power supply enters a charging state; in the charging state, the MCU main control chip IC6 generates a fifth instruction signal and sends the fifth instruction signal to the ignition interface control program module, the AC interface control program module, and the voice conversion program module, respectively; after receiving the fifth instruction signal, the ignition interface control program module and the AC interface control program module are stopped to be operated; after receiving the fifth instruction signal, the voice conversion program module sends the corresponding voice data signal to the voice module for unscrambling the voice data packet to acquire voice data indicating the charging state; the voice data is broadcast through the loudspeaker;

when the battery over-discharging and over-charging protection circuit detects that the storage battery has been fully charged, the MCU main control chip IC6 determines that the automobile starting power supply is in a charging completion state; in the charging completion state, the MCU main control chip IC6 generates a sixth instruction signal and sends the sixth instruction signal to the voice conversion program module; after receiving the sixth instruction signal, the voice conversion program module sends the corresponding voice data signal to the voice module for unscrambling the voice data packet to acquire voice data indicating that the charging has been completed; and the voice data is broadcast through the loudspeaker.

9. The voice broadcast method of the automobile starting power supply according to claim 6, wherein a timing program is further set in the MCU main control chip IC6; when the automobile starting power supply is in the startup state, and the ignition interface control program module is operated, the timing program is operated; within 5 minutes, if no ignition action occurs at the ignition output interface, the timing program controls the ignition interface control program module to be stopped to be operated.

* * * * *